T. J. STURTEVANT AND W. T. DOYLE.
ELEVATOR.
APPLICATION FILED OCT. 8, 1917.
1,342,470.
Patented June 8, 1920.
3 SHEETS—SHEET 1.
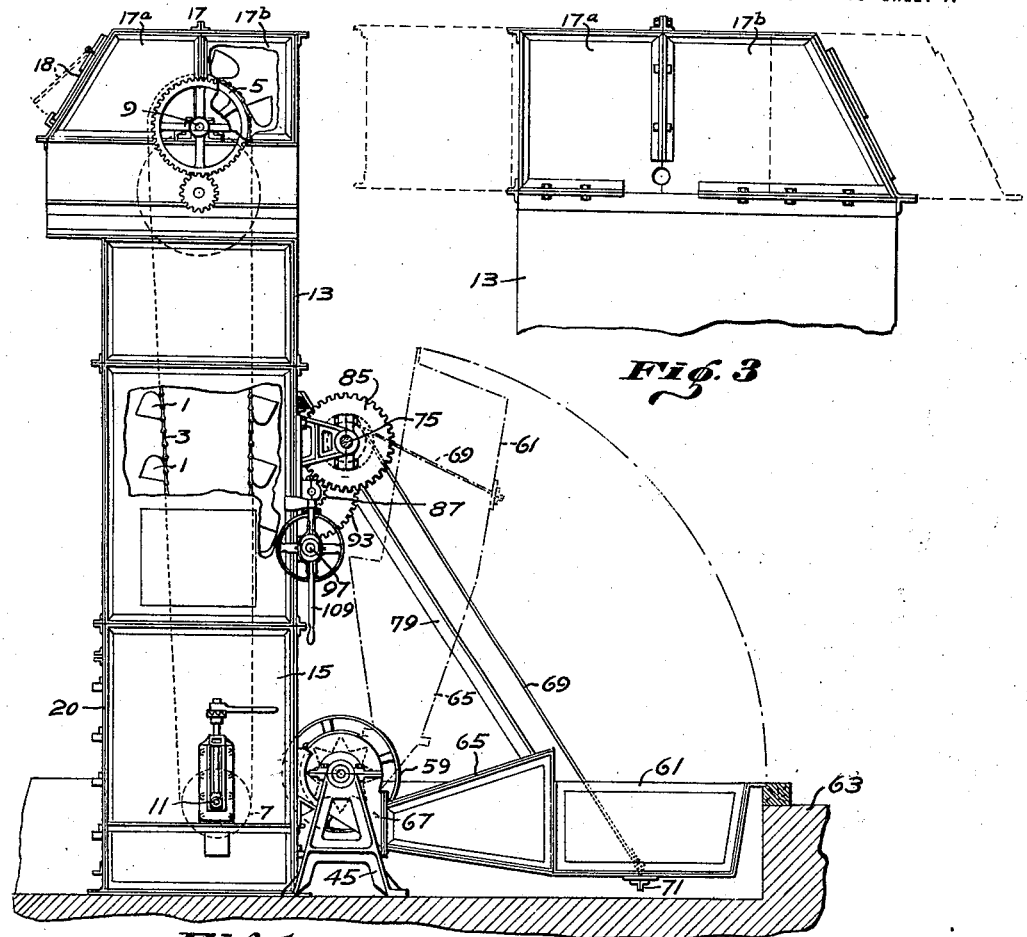
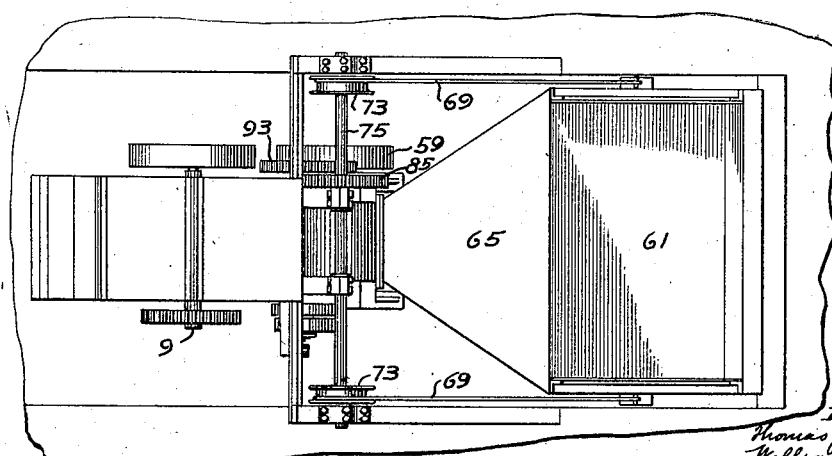

T. J. STURTEVANT AND W. T. DOYLE.
ELEVATOR.
APPLICATION FILED OCT. 8, 1917.

1,342,470.

Patented June 8, 1920.
3 SHEETS—SHEET 2.

Inventor:
Thomas J. Sturtevant &
William T. Doyle
by Robt. P. Haines
Attorney

T. J. STURTEVANT AND W. T. DOYLE.
ELEVATOR.
APPLICATION FILED OCT. 8, 1917.

1,342,470.

Patented June 8, 1920.
3 SHEETS—SHEET 3.

Inventor:
Thomas J. Sturtevant +
William T. Doyle
by Robt. C. Hains
Attorney

UNITED STATES PATENT OFFICE.

THOMAS J. STURTEVANT, OF WELLESLEY, AND WILLIAM T. DOYLE, OF BOSTON, MASSACHUSETTS, ASSIGNORS TO STURTEVANT MILL COMPANY, OF BOSTON, MASSACHUSETTS, A CORPORATION OF MAINE.

ELEVATOR.

1,342,470.  Specification of Letters Patent.  Patented June 8, 1920.

Application filed October 8, 1917. Serial No. 195,218.

*To all whom it may concern:*

Be it known that we, THOMAS J. STURTEVANT and WILLIAM T. DOYLE, citizens of the United States, and residents of Wellesley, county of Norfolk, and Boston, county of Suffolk, and State of Massachusetts, respectively, have invented an Improvement in Elevators, of which the following description, in connection with the accompanying drawings, is a specification, like characters on the drawings representing like parts.

The invention hereinafter described relates to elevators, and more particularly to means for delivering the material to be raised to the lower end of the elevator.

One important use for such elevators is in apparatus for grading, reducing, mixing, weighing and bagging batches of fertilizer and other materials.

In such apparatus, a batch of fertilizer, such, for example, as one ton, is delivered into the hopper of the elevator and lifted to a separator having a screen which grades the material into fines and tailings. The fines are delivered to a mixer, and the tailings are reduced in a pulverizer and returned to the elevator and lifted thereby to the separator, where they are graded again. This process is continued until the entire batch has been reduced to the required fineness. After the material is thoroughly mixed, it is conducted to the weighing and bagging device. Successive batches are fed into the apparatus and similarly treated.

The elevator hopper to have the capacity required, formerly had to be of considerable depth, and its mouth had to be at substantially the level of the floor or ground, in order that the batches might be dumped into the hopper from carts substantially on the level of the mouth of the hopper. As a consequence, it was necessary to construct a deep pit to receive the lower end of the elevator, in order that the mouth of the hopper should be at the required level. This was objectionable for various reasons. Among others, it added objectionably to the expense of installing the apparatus, and especially where the same was located on marshy land where the pits had to be of water-tight construction.

The present invention, among other objects, provides a construction whereby the batches may be fed to the elevator without the necessity for the deep pit to receive the lower end of the elevator.

The elevator usually comprises upper and lower wheels connected by an endless belt having buckets secured at intervals thereon for conveying the material from the lower end of the elevator casing to the upper end thereof. The belt and buckets experience heavy duty and wear, such, that after prolonged use thereof, the belt sometimes breaks and the belt and buckets fall in a confused heap and choke the lower end of the casing. Heretofore, considerable difficulty has been experienced in obtaining access to the parts, in order that they may be removed from the casing, repaired and reinstalled in proper working position in the casing. Also, the materials fed into the casing and elevated, are frequently of a character, such that they tend to pack in and choke the lower end of the casing, rendering it necessary to have access thereto for the purpose of removing the packed material from the bottom of the casing, and for the purpose of cleaning the material from the belt, buckets and other parts of the elevator.

Another object of the invention, is to provide a casing having a construction such that ready access may be had to the interior thereof for the purpose of repair and cleaning of the parts, referred to.

The character of the invention may be best understood by reference to the following description of one good form thereof shown in the accompanying drawings, wherein:—

Figure 1 is a side elevation of an elevator embodying the invention;

Fig. 2 is a plan of the elevator shown in Fig. 1;

Figure 4:
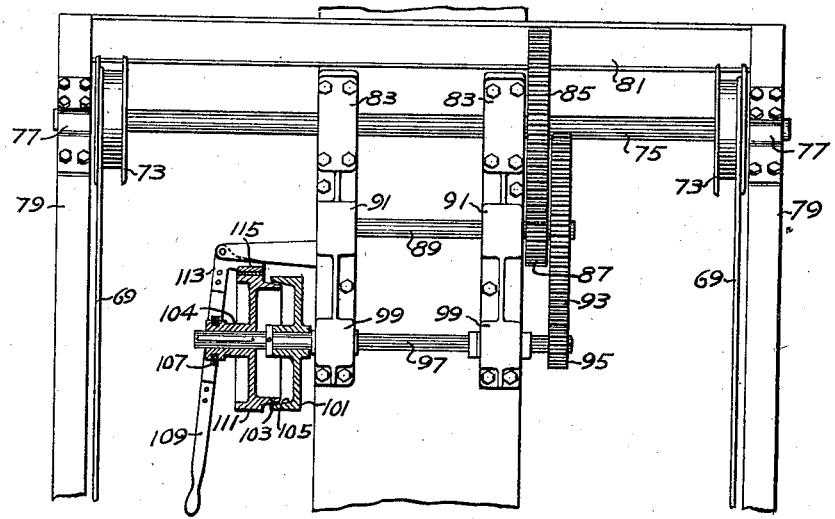
Figure 5:
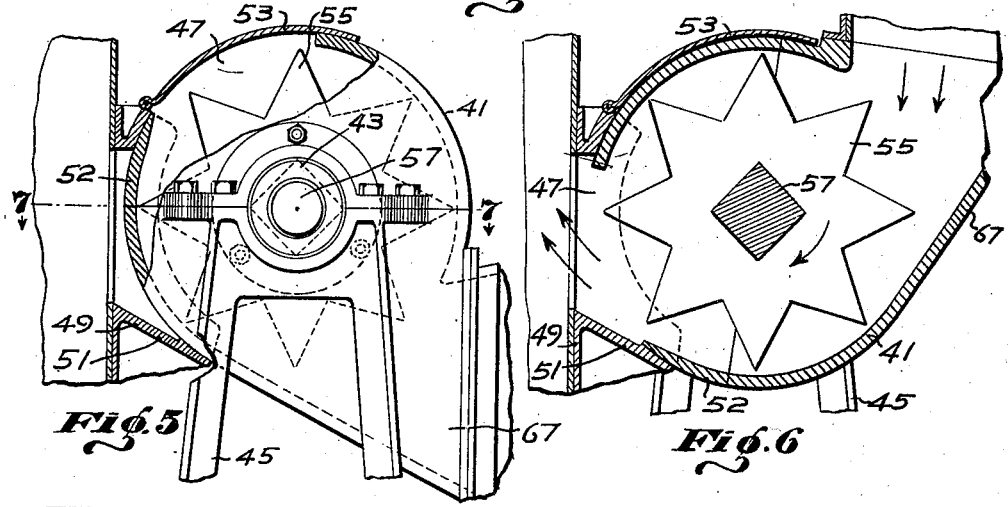
Figure 6:
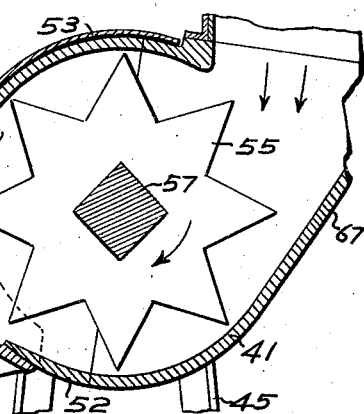
Figure 7:
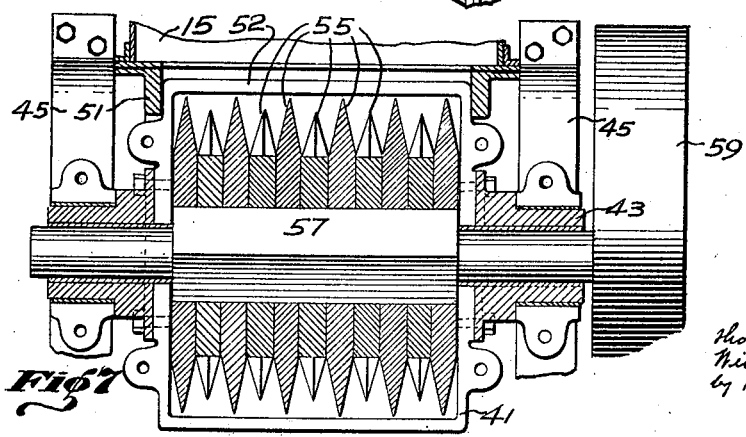
Figure 8:
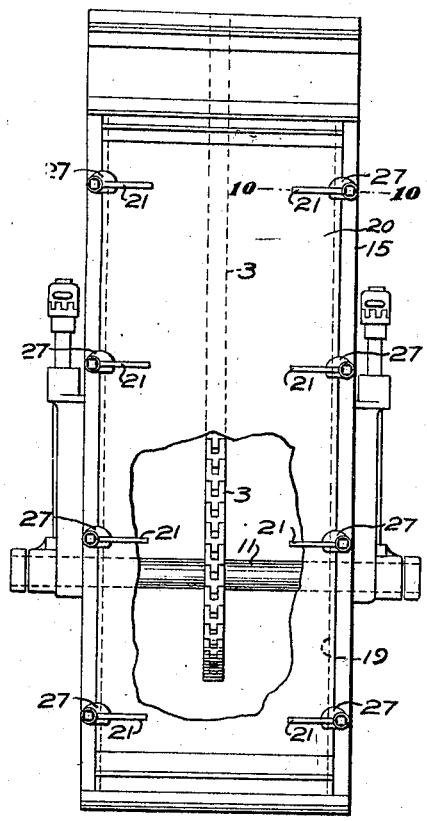
Figure 9:
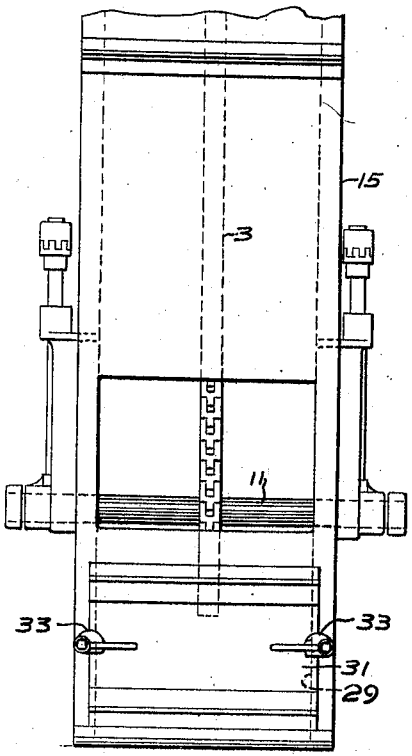
Figure 10:
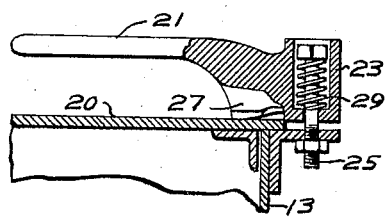
Figure 11:
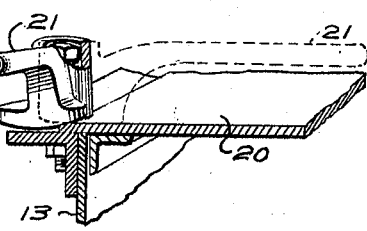

Fig. 3 on an enlarged scale is a side elevation of a head at the upper end of the casing constructed of sections which may be readily separated to permit access to the shaft, wheel, belt and buckets at the upper end of the casing;

Fig. 4 on an enlarged scale is an elevation of a part of the mechanism for lifting a batch of material and dumping the same into the hopper adjacent the lower end of the elevator;

Fig. 5 is a vertical section through the breaker feeder and its casing, showing the latter in position to cut off communication between the casing and the elevator;

Fig. 6 is a view similar to Fig. 5 showing the casing in position permitting communication between the same and the elevator to deliver material from the former to the latter;

Fig. 7 is a horizontal section through the breaker feeder and its casing taken on line 7—7 of Fig. 5;

Fig. 8 on an enlarged scale is an end elevation of the lower portion of the elevator casing showing the door construction whereby access may be had to the lower end of the casing;

Fig. 9 on an enlarged scale is an end elevation of the portion of the elevator casing showing the door construction providing access to the casing beneath the breaker feeder;

Fig. 10 on an enlarged scale is a transverse section taken on line 10—10 of Fig. 8 through one of the locking devices for the door; and Fig. 11 is a perspective view showing the locking device in two different positions of adjustment.

Referring to the drawings, the apparatus shown therein as embodying the invention comprises an elevator, in the present instance of the invention, consisting of a series of buckets 1 mounted on an endless belt 3 in the form of a chain connecting upper and lower wheels 5 and 7 on shafts 9 and 11 journaled in suitable bearings in a casing or housing 13 of sheet metal. This casing may be built of sections including a lower section or boot 15 and a head 17 at the top of the casing. To permit access to the upper shaft, wheel, belt and buckets at the top of the casing, the head may be formed of sections 17ª and 17ᵇ (Figs. 1 and 3) meeting at the upper shaft, said sections being detachably secured together and to the casing by bolts or other suitable means. One of the sections may have a door 18 hinged thereto to permit inspection of and limited access to the interior of the head.

When it is necessary to have a greater access to the interior of the head, the bolts therein may be removed, and the sections thereof may be moved apart from their positions shown in full lines to their positions shown in dotted lines in Fig. 3. When moved apart as described, they will desirably furnish convenient access to the shaft, wheel, belt and buckets at the top of the casing, permitting the same to be conveniently installed, cleaned or repaired.

To furnish access to the lower end of the casing, the latter may have a large opening 19 extending beneath the lower wheel and a substantial distance above the wheel. Preferably, this opening is sufficiently high to allow the operator to readily enter the casing. This opening is normally closed by a door or panel 20 having margins overlapping the portions of the casing adjacent the opening. To secure the door in closed position, suitable means may be provided, in the present instance of the invention, in the form of locking devices, each comprising a handle 21 (Figs. 10 and 11) having a hub 23 pivotally mounted on a bolt 25 secured to the casing, and projecting upward into a recess in said hub. A cam or locking member 27 may be formed integral with said handle and hub and be urged inward toward the door and casing by a coil spring 29 mounted in the hub recess and confined between the head of the bolt and an end of said hub.

The construction is such, that when the handle is rocked to the position shown in full lines in Fig. 10, and in dotted lines in Fig. 11, the cam will ride up over the margin of the door and tension the spring, and thereby hold the door securely onto the casing, without possibility of leakage of dust between them.

To furnish additional access to the lower end of the casing for purposes of cleaning and repair of parts therein, the casing may be provided with an opening 29 opposite the opening 19, referred to, and normally closed by a door 31 held in closed position by locking devices 33 similar to those described for the door 20.

The means for feeding the batches to the elevator, in the present instance of the invention, comprises a casing (Figs. 1, 5, 6 and 7) conveniently in the form of a drum 41 made of two parts secured together with hollow trunnions 43 fastened to opposite ends thereof journaled in bearings in a standard 45 adjacent the bottom of the elevator.

Suitable valve means is provided for admitting the materials from the drum to the elevator. In the present exemplification of the invention, this valve means comprises a port 47 (Figs. 5 and 6) in the curved wall of the drum adapted to register with an inlet mouth 49 of the elevator housing, said mouth having a flange 51 curved to conform to the contour of the casing. When the drum is rocked in one direction, the port will register with said mouth (Fig. 6) and permit the materials to be fed to the elevator, but when the drum is rocked in the opposite direction, the port will be brought to an upper position out of communication with said mouth (Fig. 5), and the latter will be closed by a portion 52 of the curved wall of the drum. A cover 53 hinged to said mouth serves to close the port and prevent escape of dust from the drum when said port is in its upper position.

To feed the materials through the drum and break up lumps therein, a breaker feeder may be provided, comprising a series of star-shaped or toothed members 55 mounted on a square portion of a shaft 57 journaled in the hollow trunnions of the drum. This shaft may have a pulley 59 (Figs. 1 and 2) fast thereon driven by a belt (not shown) from any suitable source of power.

A receiver may be provided of sufficient size to hold a batch weighing a ton or other predetermined amount. In the present instance of the invention, this receiver is in the form of a box 61 (Figs. 1 and 2) of sheet metal or other suitable material, having an open top substantially level with the floor or ground, in order that a conveyance may be moved up to and conveniently discharge the batch into the box. Preferably, the box is made shallow, so that its bottom will need to be only a short distance beneath the level 63 (Fig. 1) on which the cart or other conveyance stands when dumping a batch therein. In order that the box may be of the requisite size, it is necessary to form the same of substantial width. As shown herein, it will be noted that the box is considerably wider than the elevator.

Suitable means is provided to conduct the material from the box to the drum containing the breaker feeder. In the present instance of the invention, a hopper 65 of sheet metal or other suitable material is provided for this purpose, having an open end communicating with an open end of the box, and preferably somewhat deeper than the depth of the box, in order to catch the material if heaped somewhat above the top of the box. The hopper tapers toward and is connected to a neck 67 formed on the drum.

The receiver is secured to the hopper, and the hopper is secured to the drum, the construction being such, that said parts may be tilted on the trunnions of the drum about the axis of the breaker feeder as a fulcrum. When the parts are in the horizontal position shown in full lines in Fig. 1, the top of the receiver is substantially flush with the floor in position to receive a batch of materials. When the parts are tilted to the position shown in dotted lines in Fig. 1, the batch in the receiver will flow therefrom through the hopper to the drum. When said parts are in horizontal position, the drum will be in a position to close the inlet mouth of the elevator, as will be noted in Fig. 5, but when said parts are tilted in their upward position, the drum port will be brought into registration with said inlet mouth, as will be noted in Fig. 6, and thereby permit the materials to be delivered from the drum to the elevator.

The rotation of the breaker feeder will break up the lumps in the materials and feed the entire batch to the elevator. Then the parts are rocked down to their horizontal position in readiness to receive another batch.

Suitable means may be provided to enable tilting of the parts for the purposes described. To accomplish this, in the present instance of the invention, wire ropes 69 (Figs. 1 and 2) or other flexible members have their lower ends connected to a cross bar 71 secured to the bottom of the receiver, and their upper ends anchored to drums 73 (Figs. 2 and 4) mounted fast on a shaft 75 journaled in bearings 77 on inclined frame members 79 having their upper ends connected to a horizontal bar 81 secured to the elevator housing. Said shaft is also journaled in bearings in brackets 83 mounted on the elevator housing.

To rotate said shaft, a gear 85 is mounted thereon and driven by a pinion 87 fast on a counter shaft 89 journaled in bearings 91 mounted on the elevator housing. A large gear 93 on said counter shaft is driven by a pinion 95 fast on a second counter shaft 97 journaled in bearings 99 mounted on the elevator housing. A pulley 101 is mounted loose on the shaft 97 and adapted to be driven by a belt (not shown) from any suitable source of power.

To connect said pulley with said shaft at the times desired, suitable clutch means may be provided, in the present instance of the invention, comprising a cone member 103 (Fig. 4) having a hub 104 splined to the shaft 97 and adapted to fit into and frictionally grip a conical recess 105 in said pulley.

To shift the clutch, its hub may be grooved to receive a ring 107 connected to a hand lever 109 pivoted on a bracket 95 mounted on the elevator housing.

To hold the parts in discharging position and check the rocking thereof back to the receiving position, suitable brake means may be provided, in the present instance of the invention, comprising a brake wheel 111 conveniently integral with the cone member 103 and coöperating with a brake shoe 113 on an arm 115 of the hand lever, referred to.

The construction is such that the hand lever serves the dual function of operating the clutch and the brake. When the handle is shifted in one direction, the clutch will be closed and the brake will be released, thereby connecting the belt pulley with the shaft 97, and through the train of gears described, driving the drums which will wind the wire ropes thereon, thereby tilting the receiver to its discharging position. After the receiver has attained its proper elevation, the hand lever is shifted to open the clutch and apply the brake, thereby holding the receiver in said position until the batch is discharged therefrom through the hopper and drum to the elevator. After the batch has been discharged, the brake is released sufficiently to allow the receiver to drop back to its position in readiness to receive another batch.

By the construction described, the batch receiver may be made very shallow, so that when in its horizontal position, it will extend but a short distance beneath the level of the floor or ground. As a result, merely a shallow pit is required therefor, which may be cheaply and quickly constructed. Also, the overall height of the elevator does not need to be so great as when the deep pit is used, thereby resulting in a further important economy in construction.

The tilting mechanism for the receiver enables the receiver to be easily rocked up to its discharging position, and quickly returned to its receiving position. The valve controlling the feeding of the batch into the elevator is automatically opened and closed in the course of the rocking of the receiver to and from its discharge position without requiring attention of the operator thereto.

When the valve is closed, it will prevent dust from being blown back from the elevator into the drum and hopper, and when open the direction of rotation of the breaker feeder and the direction of discharge from the drum, indicated by arrows in Fig. 6, is such that the draft therefrom will be upward in the same general direction as the draft produced by the buckets as they sweep up past the valve port. As a consequence, blowing of dust back into the hopper is prevented at all times in the operation of the apparatus.

The sectional construction of the head of the elevator casing and the large doors in the boot with their easily operated hand locks, enable ready access to the parts for purposes of cleaning, replacement and repair thereof as required.

It will be understood that the invention is not limited to the specific embodiment shown, but that extensive deviations may be made therefrom without departing from the spirit and scope of the appended claims.

What is claimed is:

1. The combination with an elevator, of a housing therefor having an inlet, a casing having a port therein, a hopper connected to said casing, said hopper and casing being movable to bring said port into and out of communication with said inlet, and means for automatically closing said housing inlet when said port is out of communication with said inlet.

2. The combination with an elevator, of a housing therefor having an inlet, a casing having a port movable to and from registration with said inlet and a wall for closing said inlet, a support, and a receiver mounted to rock on said support from a receiving position to a position to discharge material into said casing.

3. The combination with an elevator, of a housing therefor having an inlet, a support having bearings thereon, a casing having a delivery port, and hollow trunnions journaled in said bearings, a shaft journaled in said hollow trunnions, and a breaker feeder mounted on said shaft in said casing, said casing and its trunnions being adapted to rock to bring said port into and out of registration with said inlet.

4. The combination with an elevator, of a casing therefor, a receiver having an open top to receive a charge of material when said receiver is in a substantially horizontal position, means to tilt said receiver to deliver the material through one end thereof, means to conduct the material from said end to the elevator casing, a valve operable on movement of said receiver for permitting or preventing passage of material from said conducting means to said casing.

5. The combination with an elevator, of a fixed casing therefor mounted in upright position and having an inlet opening adjacent the lower end thereof, a feed casing for communication with said opening, a receiver communicating with said feed casing, means to rock said receiver to a position for receiving a charge of material and to a position to deliver the material into said feed casing, and a rotary feeder mounted in said feed casing for feeding the material therefrom through said inlet opening into said fixed casing to be elevated by said elevator.

6. An elevator, comprising, in combination, a single chamber casing having a boot at the lower end thereof and a head at the upper end thereof having separable sections, a shaft journaled in bearings in said boot, a shaft journaled in bearings adjacent the top of said casing at the juncture of said head sections, but independently of said sections, means detachably to secure said head sections to the top of said casing, wheels on said shafts, an endless carrier connecting said wheels and having buckets thereon, a door for said boot sufficiently large to admit a man into said boot for access to the elevator parts therein, and means to secure said door in dust-tight closed position.

In testimony whereof we have signed our names to this specification.

THOMAS J. STURTEVANT.
WILLIAM T. DOYLE.